(12) United States Patent
Gautron et al.

(10) Patent No.: US 9,569,884 B2
(45) Date of Patent: Feb. 14, 2017

(54) METHOD FOR GENERATING SHADOWS IN AN IMAGE

(75) Inventors: Pascal Gautron, Cesson Sevigne (FR); Jean-Eudes Marvie, Cesson Sevigne (FR); Gerard Briand, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 543 days.

(21) Appl. No.: 13/138,652

(22) PCT Filed: Mar. 26, 2010

(86) PCT No.: PCT/EP2010/053976
§ 371 (c)(1),
(2), (4) Date: Sep. 15, 2011

(87) PCT Pub. No.: WO2010/109002
PCT Pub. Date: Sep. 30, 2010

(65) Prior Publication Data
US 2012/0001911 A1 Jan. 5, 2012

(30) Foreign Application Priority Data
Mar. 27, 2009 (EP) .................................. 09364002

(51) Int. Cl.
*G06T 15/50* (2011.01)
*G06T 15/60* (2006.01)
*G06T 15/80* (2011.01)

(52) U.S. Cl.
CPC ............. *G06T 15/60* (2013.01); *G06T 15/50* (2013.01); *G06T 15/80* (2013.01)

(58) Field of Classification Search
CPC .................................................... G06T 15/60
(Continued)

(56) References Cited

U.S. PATENT DOCUMENTS 5,739,820 A * 4/1998 Lyon ............................ 345/426
5,742,749 A 4/1998 Foran et al.
(Continued)

OTHER PUBLICATIONS

Behrens, U.; Ratering, R., "Adding shadows to a texture-based volume renderer," IEEE Symposium on Volume Visualization, 1998. pp. 39-46, Oct. 24-24, 1998.*
(Continued)

*Primary Examiner* — Kee M Tung
*Assistant Examiner* — Roberta D Prendergast
(74) *Attorney, Agent, or Firm* — Tutunjian & Bitetto, P.C.

(57) ABSTRACT

As to generate shadows in an image, the method comprises the steps of:
  Computing a depth-map that comprises an array of pixels, wherein pixels in the depth-map are associated to a single value corresponding to depth value that indicates a depth from a light source to a portion of nearest occluding object visible through the pixel,
  projecting a point visible through a pixel of said image into a light space, the result of said projection being a pixel of said depth-map,
  calculating a distance between the said visible point and the light source,
  fetching the depth value associated to said pixel of depth-map,
  computing, for said pixel of said image, an adaptive bias as a function of a predetermined base bias and a relationship between the normal of a surface on which the said visible point is located and incident light direction at said visible point,
  comparing for said pixel in the image, the distance between said visible point and the light source with the sum of the corresponding depth map value and said adaptive bias,
  labelling said point visible through said pixel as lit or shadowed according to said comparison.

7 Claims, 4 Drawing Sheets

(58) Field of Classification Search
USPC .......................................................... 345/426
See application file for complete search history.

(56) References Cited

U.S. PATENT DOCUMENTS

| | | | |
|---|---|---|---|
| 5,870,097 A * | 2/1999 | Snyder et al. ................ | 345/426 |
| 5,880,736 A | 3/1999 | Peercy et al. | |
| 6,252,608 B1 * | 6/2001 | Snyder et al. ................ | 345/473 |
| 6,593,923 B1 * | 7/2003 | Donovan et al. ............. | 345/422 |
| 6,664,963 B1 * | 12/2003 | Zatz ............... | 345/426 |
| 6,791,544 B1 | 9/2004 | Hong et al. | |
| 7,075,530 B2 * | 7/2006 | D'Amora ..................... | 345/419 |
| 7,106,326 B2 * | 9/2006 | Deering et al. .............. | 345/426 |
| 7,119,806 B1 | 10/2006 | Donovan et al. | |
| 7,969,438 B2 * | 6/2011 | Xie ................ | 345/426 |
| 8,471,853 B2 * | 6/2013 | Dai et al. ..................... | 345/426 |
| 2003/0076320 A1 * | 4/2003 | Collodi ........................ | 345/426 |
| 2004/0160441 A1 * | 8/2004 | Lokovic et al. ............. | 345/426 |
| 2004/0174360 A1 * | 9/2004 | Deering et al. .............. | 345/426 |
| 2004/0239673 A1 * | 12/2004 | Schmidt ....................... | 345/426 |
| 2006/0202941 A1 | 9/2006 | Morein et al. | |
| 2008/0174600 A1 * | 7/2008 | Xie ............................... | 345/426 |
| 2008/0278491 A1 * | 11/2008 | Tartaglia et al. ............. | 345/426 |
| 2009/0109222 A1 * | 4/2009 | Dai et al. ..................... | 345/426 |

OTHER PUBLICATIONS

Kniss, J.; premoze, S.; Hansen, C.; Shirley, P.; McPherson, A., "A model for volume lighting and modeling," Visualization and Computer Graphics, IEEE Transactions on , vol. 9, No. 2, pp. 150,162, Apr.-Jun. 2003.*

Reeves, William T., David H. Salesin, and Robert L. Cook. "Rendering antialiased shadows with depth maps." In ACM SIGGRAPH Computer Graphics, vol. 21, No. 4, pp. 283-291. ACM, 1987.*

Anonymous, "Radial Basis Function,", Wikipedia definition, retrieved from: https://en.wikipedia.org/wiki/Radial_basis_function.*

Schuler et al., "Eliminating Surface Acne with Gradient Shadow Mapping", Advanced Rendering Techniques, Charles River Media, Inc., Hingham Massachusetts, Jan. 12, 2006, pp. 289-297.

Foley et al., Computer Graphics: Principles and Practice Second Edition, Jan. 1, 1996, pp. 721-731.

Search Report Dated Jun. 10, 2010.

Williams, L., "Casting Curved Shadows on Curved Surfaces" SIGGRAPH '78 Proceedings of the 5th annual conference on Computer graphics and interactive techniques, Aug. 1978, pp. 270-274.

Fernando et al., "Adaptive Shadow Maps", SIGGRAPH '01 Proceedings of the 28th annual conference on Computer graphics and interactive techniques, Aug. 2001, pp. 387-390.

Crow, F., "Shadow Algorithims for Computer Grpahics", SIGGRAPH '77, Jul. 1977, pp. 242-248.

Bunnell et al., "Chapter 11, Shadow Map Antialiasing" GPU Gems: Programming Techniques, Tips and Tricks for Real-Time Graphics, Mar. 2004, pp. 185-195.

Zhao et al., "Antialiased Shadow Algorithims for Game Rendering", Technologies for E-Learning and Digital Entertainment Lecture Notes in Computer Sciencevol. 3942, 2006, pp. 873-882.

\* cited by examiner

METHOD FOR GENERATING SHADOWS IN AN IMAGE

The invention concerns a method for generating shadows in an image.

This application claims the benefit, under 35 U.S.C. §365 of International Application PCT/EP2010/053976, filed Mar. 26, 2010, which was published in accordance with PCT Article 21(2) on Sep. 30, 2010 in English and which claims the benefit of European patent application No. 09364002.7 filed Mar. 27, 2009.

In graphics rendering, it is important to produce images that are realistic on a real-time basis. The basic difficulty in achieving total visual realism is the complexity of quickly and accurately representing real world visual effects. A scene can include a variety of textures, color gradations, reflections, translucency, and, most particularly, shadows. Shadows enhance the realism of an image because they give a two-dimensional (2D) image the appearance of being three-dimensional.

The generation of shadows is critical in games environment for instance as it has to be generated in real-time according to the movements in the scene which are guided by the games users.

In the past, there have been a number of different ways to determine how objects in a scene would cast shadows and how these shadows should be represented in the rendered image.

A common shadowing method, called shadow volumes is described in the document from F. Crow entitled "Shadow Algorithms for Computer Graphics" published in the proceedings of SIGGRAPH in 1977.

In this document, the silhouette of shadow-casting objects is extruded to determine the shadowing. While this method provides high quality shadows, it is limited to simple scenes and is computationally intensive.

A more general technique for real-time shadow generation is described in the document from L. Williams entitled "Casting curved shadows on curved surfaces" published in the proceedings of SIGGRAPH in 1978.

While this method is very efficient and easy to implement, it suffers from sampling drawbacks due to the finite resolution of the shadow map: most of the time a single shadow map texel gets used in several pixels of the final image, yielding several aliasing artifacts. The most known artifact is the apparition of shadow blocks in the final image.

This artifact can typically be reduced using percentage-closer filtering disclosed in the article from M. Bunnell and F. Pellacini entitled "Shadow Map Antialiasing" published in GPU Gems, Addison Wesley Edition in 2004, in which several shadow map texels are used to determine the percentage of lighting incoming to the point. Many other methods have been devised to reduce such aliasing artifacts by focusing the shadow map only on the visible parts of the scene. However all those methods are view-dependent, and hence require regenerating the shadow map for each movement of the user. Furthermore, the quality of the shadow map is not constant depending on the user location.

Another artifact is due both to the precision of the distance information and to the limited resolution of the map: the distance comparison may return erroneous values for occluding objects very close to each other, or on surfaces nearly tangent to the light direction. To overcome this problem, the user-defined bias value offsets the distance comparisons so that erroneous shadowing is removed. However, this results in an undesired shifting of the shadows. As a same bias value is used for rendering the entire scene, 'problematic' objects force a shifting of all the other shadows to avoid artifacts.

U.S. Pat. No. 5,870,097 filed on Jan. 27, 1996 in the name of Snyder, proposes a method for improving shadowing in a graphics rendering system. It proposes an automatic calculation of a bias for shadow-mapping. However, the method proposed in this patent requires complex computations, and namely a computation of the distance from the source to the two closest surfaces.

The present invention proposes to solve at least one of these drawbacks. To this end, the present invention concerns a method for generating shadows in an image comprising the steps of:

Computing a depth-map that comprises an array of pixels, wherein pixels in the depth-map have a depth value that indicates a depth from the light source to a portion of the nearest occluding object visible through the pixel, projecting each point visible from a virtual camera into the light space, calculating the distance between the said visible projected point and the light source, fetching the depth value in the depth-map corresponding to the light ray from the light source to said visible projected point.

The method further comprises the steps of computing, for each pixel, an adaptive bias as a function of a predetermined base bias and the orientation of the surface on which the said visible point is located, comparing for each pixel in the image, the distance between said visible projected point and the light source with the sum of the corresponding depth map value and said adaptive bias, labelling said pixel as lit or shadowed according to said comparison.

Preferentially, said adaptive bias is dependant on said surface normal.

According to a preferred embodiment, said adaptive bias is defined as the division of said predetermined base bias by the dot product of the surface normal by the incident light direction.

Preferentially, said adaptive bias is limited to a maximum value.

According to a second aspect, the invention concerns also a graphics processing unit comprising code instructions for performing the method according to any of the previous claims.

According to a third aspect, the invention concerns also a computer program product for computing shadows for an image, the computer program product comprising a computer-readable medium containing computer program code for performing the steps of the method according to any of claims 1 to 4.

According to a second aspect, the invention concerns a graphics processing unit comprising code instructions for performing the method according to any of the previous claims.

According to a third aspect, the invention concerns a computer program product for computing shadows for an image, the computer program product comprising a computer-readable medium containing computer program code for performing the steps of the method according to the invention.

Other characteristics and advantages of the invention will appear through the description of a non-limiting embodiment of the invention, which will be illustrated, with the help of the enclosed drawings.

Figure 1:
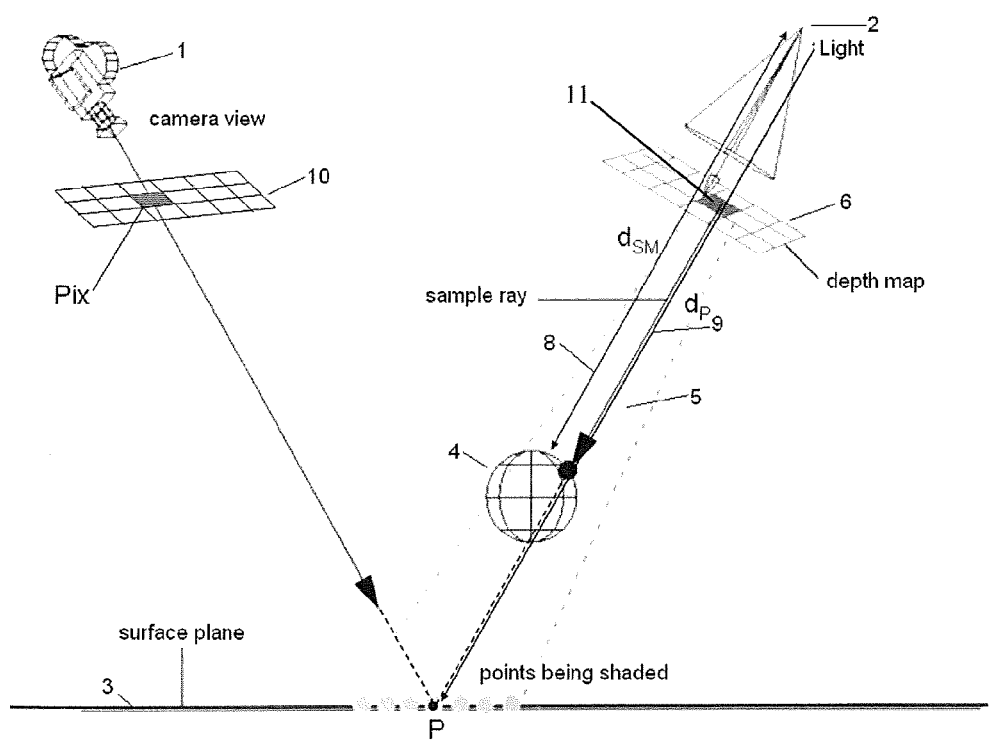
FIG. 1 represents an overview of a scene for which shadows have to be generated.

On FIG. 1, the scene for which shadows have to be generated is represented. The proposed method enables the generation of shadows in real-time. When a video game is played, according to the displacement of persons in a scene, guided by the user, the shadows have to be generated in real-time. Therefore, the method is advantageously executed thanks to a Graphics Processing unit, known under the acronym of GPU, on a computer or graphics processing board of a computer. The GPU will execute the software instructions to execute the method which is disclosed hereafter. The code instructions are stored on a computer-readable medium, such as a memory.

The method is based on the fact that a light source and a virtual camera are positioned in the scene. One embodiment is shown on FIG. 1.

A virtual camera 1 captures the scene according to a particular point of view, which gives as result an image 10 representative of the scene, for which shadows have to be generated. A light source 2 is positioned as shown on FIG. 1. A sphere 4 is located in the scene and represents an occluding object for an image 10. Some pixels of the image 10 are associated to points belonging to a plane surface 3, these pixels corresponding to the pixels of the image 10 through which points of of the plane surface are visible by the virtual camera 1. The light source 2 projects light rays 5 which illuminate part of the sphere 4. The image 10 comprises an array of pixels that represent a three-dimensional scene as viewed from a particular point of the virtual camera 1. For a given light source 2, a depth map 6 is computed. The depth map 6 includes an array of pixels, where instead of having a color value, each pixel has a depth value. Each pixel in the depth map has coordinates ($x_{sm}$, $y_{sm}$). In one embodiment, the depth value is defined with reference to a z-axis, which is normal to the depth-map.

Figure 2:
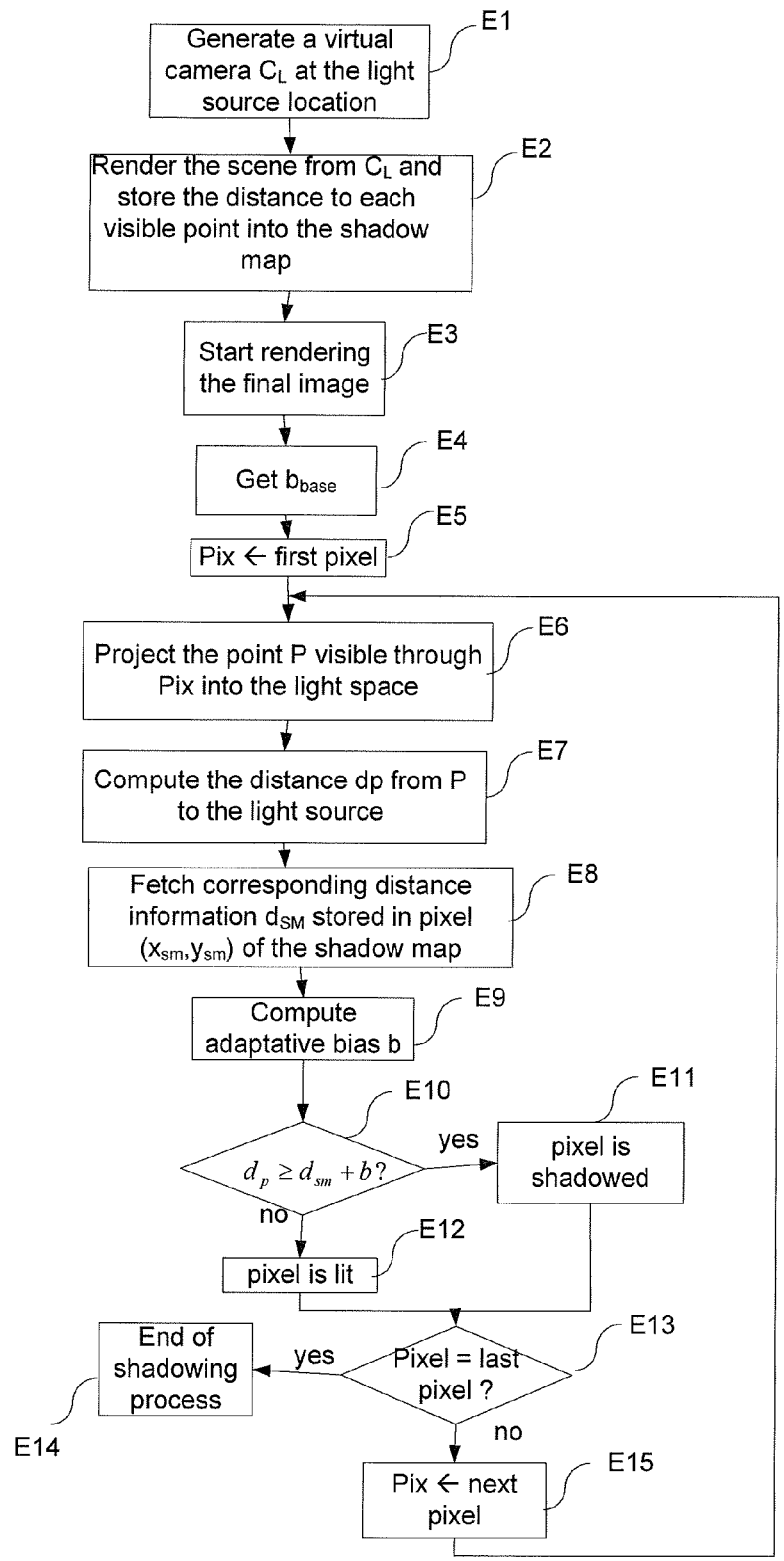
FIG. 2 represents an algorithm of shadow mapping, with adaptive bias.

The flowchart given in FIG. 2 is based on a real-time shadow-mapping algorithm but it is not limited to this method and the invention can be based on any shadow mapping-based technique.

In the case of perspective shadow mapping methods, steps E2 and E7 described later on are different.

In a step E1, a camera is positioned at the light source location, thanks to the facilities offered by virtual reality.

In a step E2, the scene is rendered from the camera positioned at the light source location. The distance $d_{sm}$ ($x_{sm}$, $y_{sm}$), visible on FIG. 1 with reference numeral 8, to each point which is visible from this camera position is stored in the shadow map. The shadow map is a depth-map texture stored in a graphics memory.

In a step E3, the rendering process is initialized and in the following steps the camera is located in its original position.

In a step E4, the user defines the bias $b_{base}$ which depends only on the scene scale. For instance, the value 0.1 is suitable for a scene which length unit is the meter.

In a step E5 a first pixel Pix as in the final image is chosen. All the pixels will be chosen one after the others. In other embodiments, depending on the processor capabilities, several pixels can be processed simultaneously.

In a step E6, the point P visible through pixel Pix is projected into the light space. The light space corresponds to a representation of the scene (as represented in the image (10) as seen from the light source 2.

In a step E7, the distance $d_p$ from P to the light source is computed according to any method well known by the person skilled in the art, for example by using Euclidean distance. It is shown on FIG. 1 as reference numeral 9.

This light ray, from the light source to the point P, crosses the depth map at pixel (11) of coordinates ($x_{sm}$, $y_{sm}$) and the corresponding distance $d_{sm}$ ($x_{sm}$, $y_{sm}$) to the nearest occluder is fetched from the shadow map in a step E8.

Figure 4:
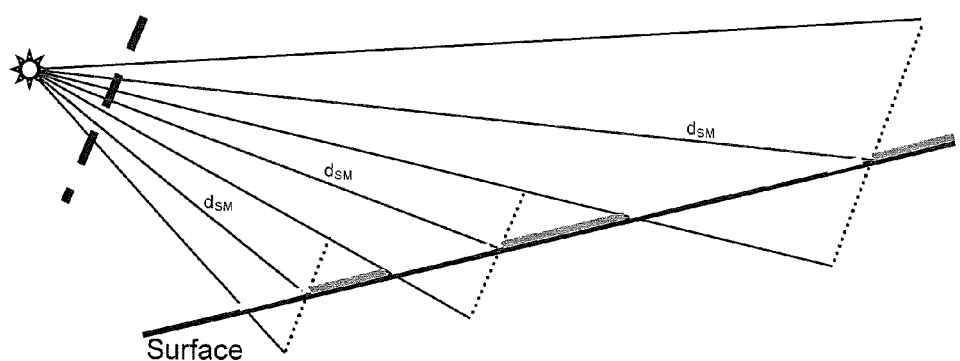
FIG. 4 represents the aliasing phenomenon on surfaces.

In a step E9, an adaptive bias is computed. As shown in FIG. 4, in conventional methods, there is aliasing on surfaces. Aliasing artifacts tend to appear when the rendered surface gets tangent to the lighting direction.

As each pixel of the shadow map stores the distance to the point visible in the middle of the pixel, the limited sampling rate yields zones in which points are successively labeled as lit or shadowed.

To remove the artifacts, the bias value must be raised. Conversely, surfaces nearly perpendicular to the lighting direction do not require a high bias value.

According to the present embodiment of the invention, based on the surface orientation at each visible point, a per-pixel bias adaptation function is defined. Given the user-defined base bias value $b_{base}$ which only depends on the scene scale, the actual bias b used to determine the shadowing is computed according to the following equation:

$$b = b_{base} / \max(\epsilon, -(N \cdot L))$$

where '.' is the vector dot product operator, N is the surface normal, L is the incident light direction and E is a minimum value, typically 0.05, to prevent the bias value to go to infinity when N gets nearly perpendicular to L.

Figure 3:
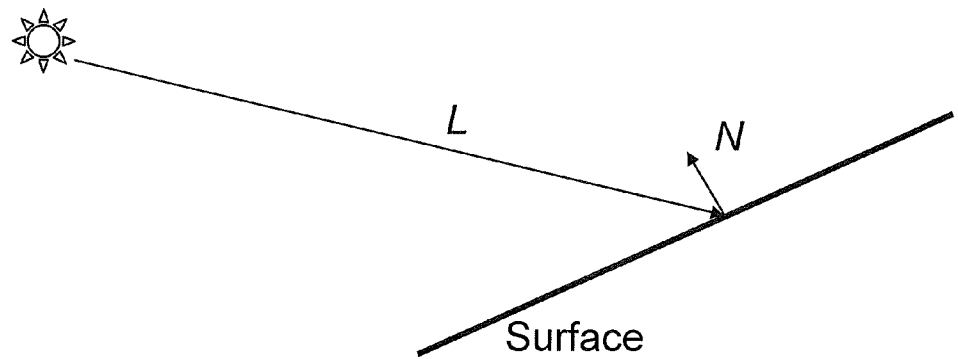
FIG. 3 represents the values used in the bias calculation according to a preferred embodiment of the invention.

FIG. 3 illustrates this by showing the L and N representations. The more the vectors −L and N are close to colinearity, i.e. the angle formed by vectors −L and N is narrow, the lower the value of the adaptive bias b is, i.e. the value of the adaptive bias b is close to the base bias $b_{base}$. Indeed, in such a case, the uncertainty related to the characteristic shadowed or lit of the pixel is low, therefore the tolerance in the depth comparison is low. The more the vectors −L and N are close to orthogonality, i.e. the angle formed by vectors −L and N is open, the higher the value of the adaptive bias b is, i.e. the value of the adaptive bias b is high (for example up to 20 times the value of $b_{base}$) and, in such a case, the uncertainty related to the characteristic shadowed or lit of the pixel is high. The tolerance in the depth comparison is then high.

In a step E10, a test is performed. $D_p$ represents the distance from the light source to the point P and $D_{sm}$ represents the distance from the light source to the shadow map.

If $d_p \geq d_{sm} + b$, then one moves forward to a step E11 in which the point P associated to the pixel Pix is labeled as a shadowed pixel.

If $d_p < d_{sm} + b$, then one moves forward to a step E12 in which the point P associated to the pixel Pix is labeled as a lit pixel.

Then one moves further to step E13, in which a test is performed in order to check whether this is the last pixel of the scene. If yes, the whole scene has been processed, otherwise, one moves further to step E15, in which a next pixel is chosen and one moves back to step E6, and so on and so forth until all pixels have been reviewed (step E14).

When all the pixels of the image have been labeled either lit or shadowed, an image processing method is performed on these pixels to respectively light or shadow them.

Figure 5:
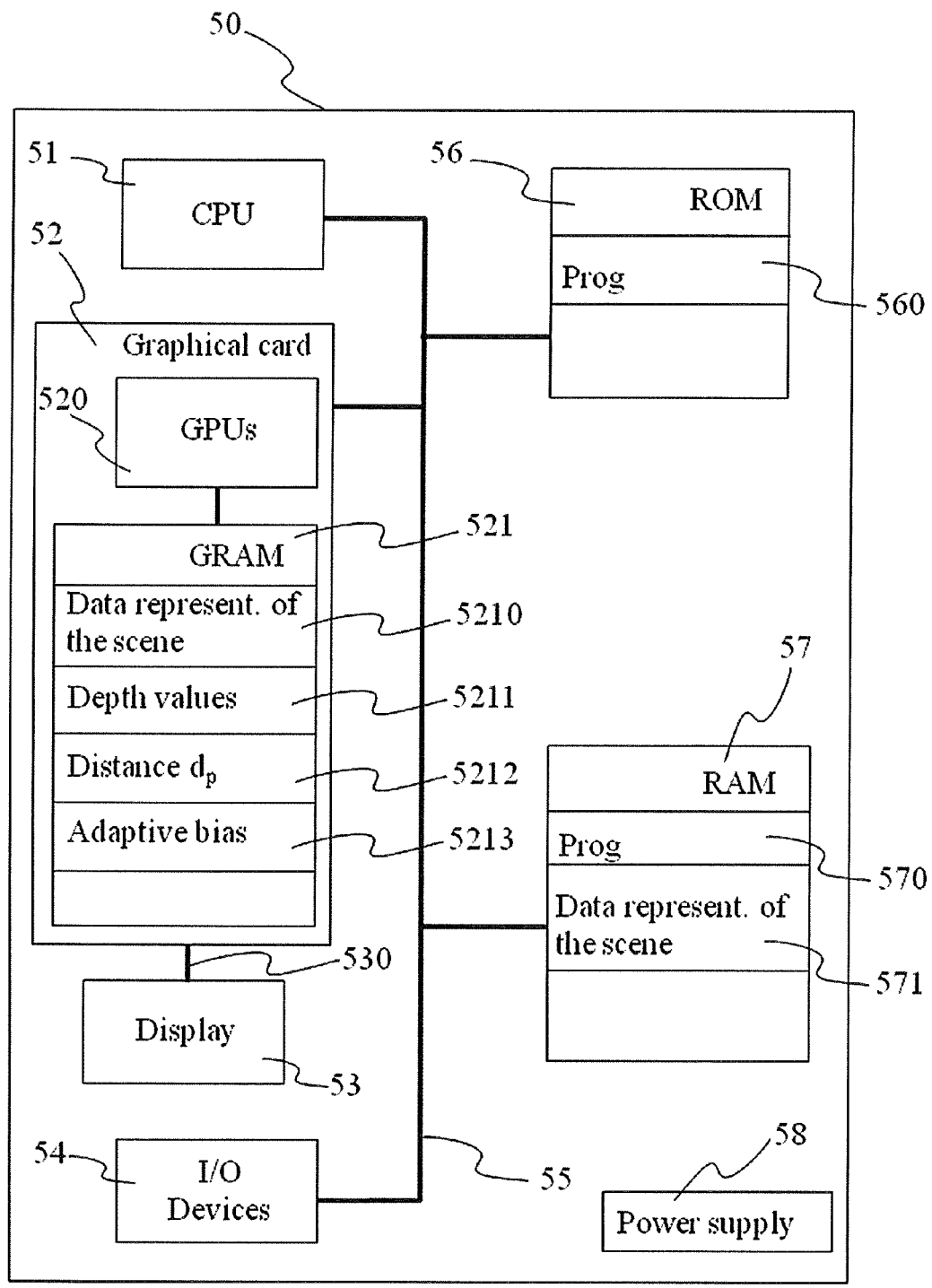
FIG. 5 represents a device implementing the method of shadow mapping, according to an embodiment of the invention.

FIG. 5 illustrates schematically a hardware embodiment of a device 5 adapted for generating shadows in an image. The device 5 corresponds for example to personal computer, to a laptop, to a game console or to any image processing unit. The device 5 comprises following elements, linked together by an address and data bus 55:

- a microprocessor 51 (or CPU);
- a graphical card 52 comprising:
    several graphical processing units 520 (CPUs);
    a graphical random access memory 521;
- a non volatile memory such as ROM (Read Only Memory) 56;
- a RAM (Random Access memory) 57;
- one or several Input/Output (I/O) devices 54, such as for example a keyboard, a mouse, a webcam, and so on;
- a power supply 58.

The device 5 also comprises a display device 53 such as a display screen directly connected to the graphical card 52 for notably displaying the rendering of images computed and composed in the graphical card, for example in real time. According to a variant, the display device 53 is outside the device 5.

It is noted that the word "register" used in the description of memories 52, 56 and 57 designates in each of the memories mentioned, a memory zone of low capacity (some binary data) as well as a memory zone of large capacity (enabling a whole programme to be stored or all or part of the data representative of computed data or data to be displayed).

When powered up, the microprocessor 51 loads and runs the instructions of the algorithm comprised in RAM 57.

The memory RAM 57 comprises in particular:
- in a register 570, a "prog" program loaded at power up of the device 5;
- data 571 representative of the scene to be rendered.

Algorithms implementing the steps of the method of the invention are stored in memory GRAM 521 of the graphical card 52 associated to the device 5 implementing these steps. When powered up and once the data 571 representative of the scene have been loaded in RAM 57, GPUs 520 of the graphical card load these data in GRAM 521 and execute instructions of these algorithms under the form of microprograms called "shaders" using HLSL language (High Level Shader Language), GLSL language (OpenGL Shading Language) for example.

The memory GRAM 421 comprises in particular:
- in a register 5210, data representative of the scene to be rendered;
- depth values 5211 comprised in the depth-map;
- distance $d_p$ 5212 between a visible point P and the light source 2, for one or several points P;
- the adaptive bias 5213 computed for the pixel of the depth map associated to the visible point(s) P.

According to a variant, the power supply is outside the device 5.

The invention as described in the preferred embodiments is advantageously computed using a Graphics processing unit (GPU) on a graphics processing board.

The invention is also therefore implemented preferentially as software code instructions and stored on a computer-readable medium such as a memory (flash, SDRAM . . . ), said instructions being read by a graphics processing unit.

The foregoing description of the embodiments of the invention has been presented for the purposes of illustration and description. It is not intended to be exhaustive or to limit the invention to the precise form disclosed. Persons skilled in the relevant art can appreciate that many modifications and variations are possible in light of the above teaching. It is therefore intended that the scope of the invention is not limited by this detailed description, but rather by the claims appended hereto.

The invention claimed is:

1. A method of generating shadows in an image representing a scene, intended to be implemented in an image processing unit, wherein the method comprising:
    Computing a depth-map that comprises an array of pixels, wherein pixels in the depth-map are associated to a single value corresponding to depth value that indicates a depth from a light source to a portion of nearest occluding object visible through the pixel,
    projecting a point visible through a pixel of said image into a light space,
    the result of said projection being a pixel of said depth-map,
    calculating a distance between the said visible point and the light source,
    fetching the depth value associated with said pixel of depth-map,
    computing, for said pixel of said image, an adaptive bias by dividing a determined base bias by a vector dot product of a normal of a surface on which the said visible point is located and incident light direction at said visible point, said determined base bias being a constant value for the scene;
    comparing for said pixel in the image, the distance between said visible point and the light source with a sum of the corresponding depth map value and said adaptive bias,
    labelling said point visible through said pixel as lit or shadowed according to said comparison.

2. The method according to claim 1, wherein said adaptive bias is limited to a maximum value.

3. The method according to claim 1, wherein the determined base bias depends on a scene scale.

4. A non-transitory computer-readable medium storing computer-executable instructions performing all the steps of the method according to claim 1 when executed on a computer.

5. A graphics processing unit configured to generate shadows in an image representing a scene, wherein the graphics processing unit comprises at least one processor configured to:
    compute a depth-map that comprises an array of pixels, wherein pixels in the depth-map are associated to a single value corresponding to depth value that indicates a depth from a light source to a portion of nearest occluding object visible through the pixel;
    project a point visible through a pixel of said image into a light space, the result of said projection being a pixel of said depth-map;
    calculate a distance between the said visible point and the light source;
    fetch the depth value associated with said pixel of depth-map;
    compute, for said pixel of said image, an adaptive bias by dividing a determined base bias by a vector dot product of a normal of a surface on which the said visible point is located and incident light direction at said visible point, said determined base bias being a constant value for the scene;

compare for said pixel in the image, the distance between said visible point and the light source with a sum of the corresponding depth map value and said adaptive bias; and label said point visible through said pixel as lit or shadowed according to said comparison.

6. The graphics processing unit according to claim 5, wherein said adaptive bias is limited to a maximum value.

7. The graphics processing unit according to claim 5, wherein the determined base bias depends on a scene scale.

* * * * *